United States Patent
Yoshioka et al.

(10) Patent No.: US 8,782,445 B2
(45) Date of Patent: Jul. 15, 2014

(54) INFORMATION PROCESSING APPARATUS AND POWER SUPPLY CONTROL METHOD

(75) Inventors: Kazuhiro Yoshioka, Akishima (JP); Tooru Mamata, Akiruno (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 375 days.

(21) Appl. No.: 13/229,255

(22) Filed: Sep. 9, 2011

(65) Prior Publication Data
US 2012/0084576 A1    Apr. 5, 2012

(30) Foreign Application Priority Data
Sep. 30, 2010  (JP) ................... 2010-223190

(51) Int. Cl.
*G06F 1/00*   (2006.01)
*G11B 17/04*  (2006.01)
*G11B 7/00*   (2006.01)
*H04N 5/77*   (2006.01)

(52) U.S. Cl.
USPC ........... 713/300; 713/340; 720/601; 720/619; 720/659; 386/361

(58) Field of Classification Search
USPC ........... 713/300, 340; 386/361; 720/601, 619, 720/659
See application file for complete search history.

(56) References Cited

U.S. PATENT DOCUMENTS 7,836,319 B2 * 11/2010 Oh et al. ........................ 713/323
7,929,383 B2 *  4/2011 Yamazaki et al. ......... 369/30.27
8,387,079 B2 *  2/2013 Andou et al. ................. 720/602
8,583,951 B2 * 11/2013 Kuno ............................ 713/321
2006/0184809 A1  8/2006 Kojou et al.
2008/0288801 A1  11/2008 Takahashi

FOREIGN PATENT DOCUMENTS

| JP | H05-233551   | 9/1993 |
| JP | H09-102160   | 4/1997 |
| JP | 2005-222679  | 8/2005 |
| JP | 2006-221453  | 8/2006 |
| JP | 2007-157273  | 6/2007 |
| JP | 2007-234202  | 9/2007 |

OTHER PUBLICATIONS

Japanese Office Action dated May 15, 2012 for Japanese Application No. 2010-223190 filed on Sep. 30, 2010.

* cited by examiner

*Primary Examiner* — Stefan Stoynov
(74) *Attorney, Agent, or Firm* — Knobbe Martens Olson & Bear LLP

(57) ABSTRACT

According to one embodiment, an information processing apparatus includes: an optical disk apparatus; a receiver which receives a command indicating that a tray provided in the optical disc apparatus is ejected; a power supply module which supplies electric-power to each of modules of the information processing apparatus; and a power supply controller which controls supply of electric-power to each of the modules from the power supply module. When the supply of electric-power to each of the modules is stopped, the power supply controller continues the supply of electric-power to the optical disc apparatus during a certain time. When the power supply controller receives the command within the certain time, the power supply controller ejects the tray and stops the supply of electric-power to the optical disc apparatus.

6 Claims, 4 Drawing Sheets

INFORMATION PROCESSING APPARATUS AND POWER SUPPLY CONTROL METHOD

CROSS REFERENCE TO RELATED APPLICATION(S)

The application is based upon and claims the benefit of priority from Japanese Patent Application No. 2010-223190 filed on Sep. 30, 2010, the entire content of which are incorporated herein by reference.

FIELD

Embodiments described herein relate generally to an information processing apparatus and a power supply control method.

BACKGROUND

Various types of power-saving control are applied to an optical disc apparatus provided in an information processing apparatus such as a personal computer.

For example, when an optical disc is inserted thereinto in a case where the power supply of a personal computer main unit is in an ON-state, electric-power is supplied to the optical disc apparatus during a certain time. Then, the supply of electric-power is stopped.

On the other hand, when the power supply of the personal computer main unit is in an OFF-state, the supply of electric-power to the optical disc apparatus is stopped. Accordingly, when the power supply of the personal computer main unit is turned off while a medium remains left in the optical disc apparatus, it is necessary for taking out the medium therefrom to turn on the power supply of the main unit again. Because it takes time to turn on the power supply of the main unit and boot the personal computer main unit, there are needs to quickly take out a medium from the optical disc apparatus.

DETAILED DESCRIPTION OF THE EMBODIMENTS

In general, according to one exemplary embodiment, an information processing apparatus includes: an optical disc apparatus; a receiver which receives a command indicating that a tray provided in the optical disc apparatus is to be ejected; a power supply module which supplies electric-power to each of modules of the information processing apparatus; and a power supply controller which controls supply of electric-power to each of the modules from the power supply module. When the supply of electric-power to each of the modules is stopped, the power supply controller continues the supply of electric-power to the optical disc apparatus during a certain time. When the power supply controller receives the command within the certain time, the power supply controller ejects the tray and stops the supply of electric-power to the optical disc apparatus.

Hereinafter, an embodiment is described with reference to the drawings.

Figure 1:
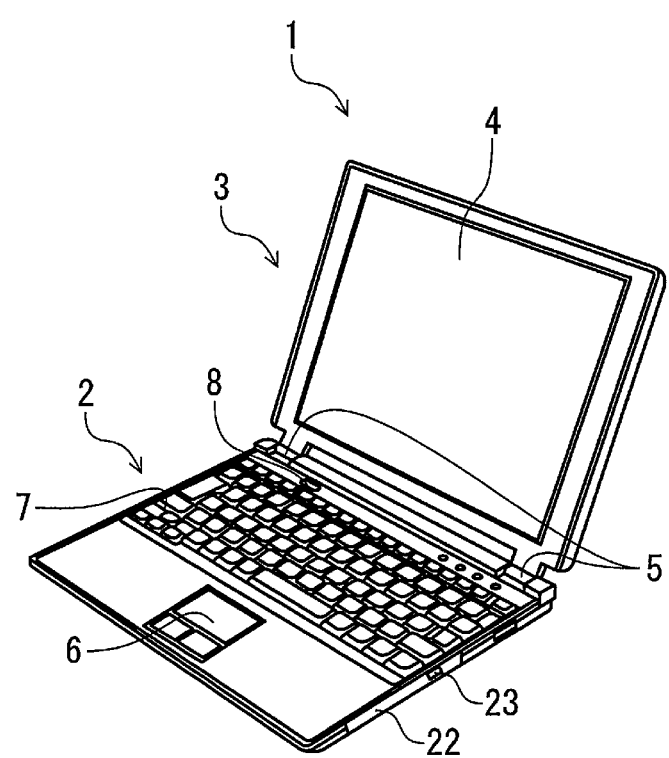
FIG. 1 is a diagram showing an external appearance of an information processing apparatus according to an embodiment.

First, an information processing apparatus according to the embodiment is described hereinafter with reference to FIG. 1. FIG. 1 is a diagram showing an external appearance of the information processing apparatus according to the embodiment. In the following description, the embodiment is described by employing a personal computer 1 as an example of the information processing apparatus. The personal computer 1 according to the embodiment has an optical disc drive (ODD) 22.

The personal computer 1 is such that a computer main unit 2 is rotatably provided with a display unit 3 via a hinge 5. The computer main unit 2 includes a touchpad 6, a keyboard 7, a power supply switch 8, an ODD 22, and an eject switch 23. The display unit 3 includes a display 4 provided at a central part thereof.

The ODD 22 has a tray for holding an optical disc and storing the optical disc in a body of the ODD 22. The eject switch 23 for ejecting the tray housed in the body of the ODD 22 is provided on a side surface of the tray. The tray can be ejected, and an optical disc held on the tray can be taken out therefrom by pushing down the eject switch 23. When the ejected tray is inserted into the body of the ODD 22 again, the supply of electric-power to the ODD 22 is unnecessary. Thus, the tray is manually inserted thereinto again.

Assuming that an optical disc is inserted into the ODD 22 of the personal computer 1 by a user, and that the user views contents stored in the optical disc, when finishing viewing the contents, the user may forget to take out the optical disc inserted thereinto and may turn off the power supply of the personal computer 1.

Thus, in order to take out the optical disc left in the ODD 22, it is necessary to turn on a system power supply of the personal computer 1 again. That is, when the system power supply of the personal computer 1 is turned off, the supply of electric-power to the ODD 22 is also stopped. Thus, even when the eject switch 23 is pushed down, the tray cannot be ejected.

Accordingly, according to a related art, the tray cannot be ejected until the power supply of the personal computer 1 is turned on again. It is necessary to wait for the supply of electric-power to the ODD 22, after the power supply of the personal computer 1 is turned on. Therefore, the related art lacks in convenience.

To solve the above problems, according to the embodiment, a power supply control-operation is performed such that the tray of the ODD 22 can be ejected without turning on the power supply of the personal computer 1 again. Hereinafter, the embodiment is described.

Figure 2:
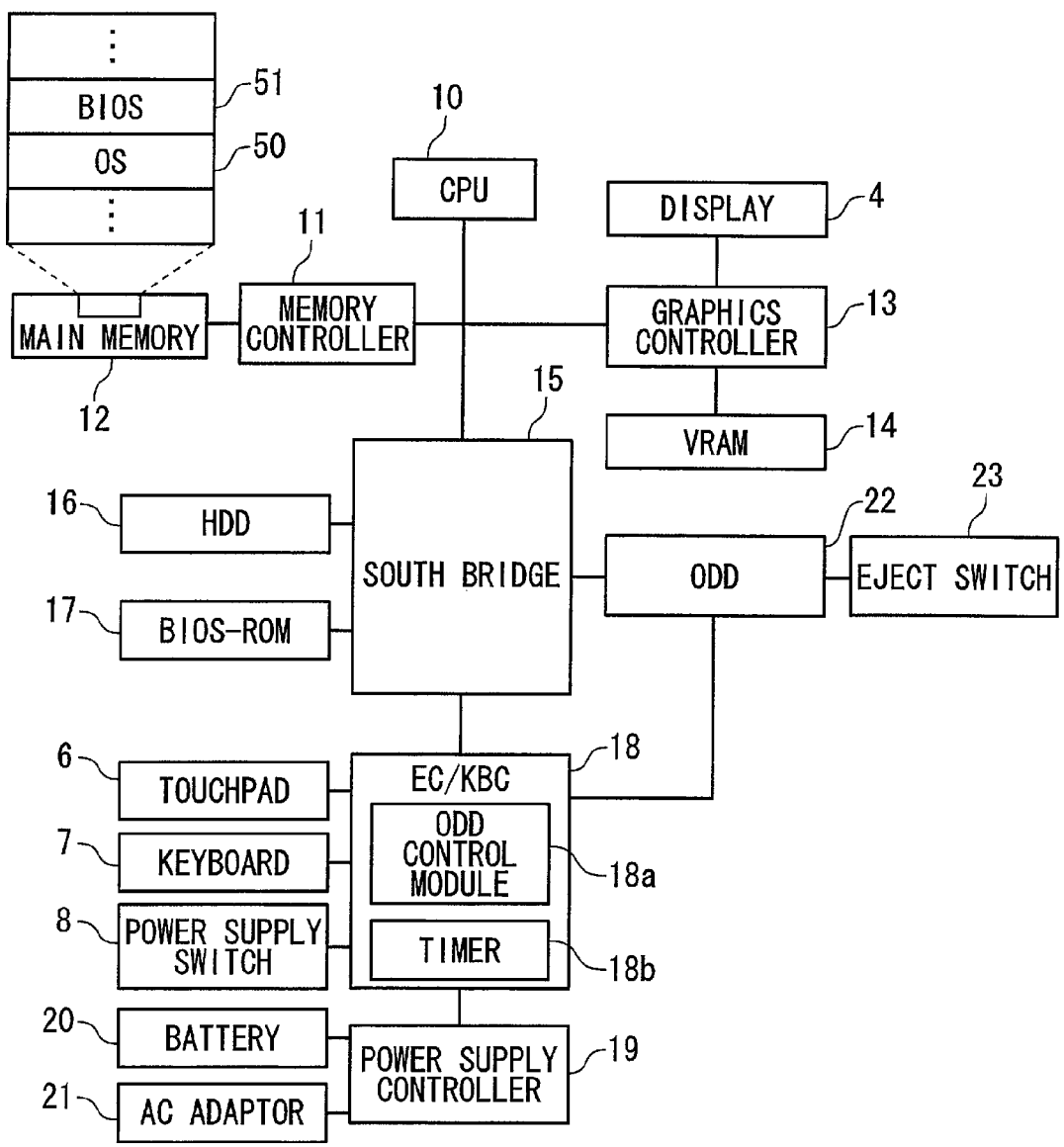
FIG. 2 is a block diagram showing functions of the information processing apparatus according to the embodiment.

The functions of the personal computer 1 according to the embodiment are described hereinafter with reference to FIG. 2. FIG. 2 is a block diagram showing the functions of the information processing apparatus according to the embodiment.

The personal computer 1 is configured to include a display 4, the touchpad 6, the keyboard 7, the power supply switch 8, a central processing unit (CPU) 10, a memory controller 11, a main memory 12, a graphics controller 13, a video random access memory (VRAM) 14, a southbridge 15, a hard disk drive (HDD) 16, a basic input/output system read-only memory (BIOS-ROM) 17, an embedded controller/keyboard controller (EC/KBC) 18, a power supply controller 19, a battery 20, an alternating current (AC) adapter 21, the ODD 22, and the ejection switch 23. The EC/KBC 18 has an ODD control module 18a and a timer 18b.

The CPU 10 is a processor provided for controlling an operation of the personal computer 1 and to execute an operating system (OS) 50 and various types of application programs loaded into the main memory 12 from the HDD 16. The CPU 10 executes a system BIOS 51 stored in the BIOS-ROM 17 after the system BIOS 51 is loaded into the main memory 12. The system BIOS 51 is a program for hardware control.

The memory controller 11 controls access to the main memory 12. The main memory 12 is what is called a working memory into which the OS 50 and various types of application programs stored in the HDD 16 and the system BIOS 51 stored in the BIOS-ROM 17 are loaded.

The graphics controller 13 is a display controller that controls the display 4 used as a display monitor of the computer 1. The graphics controller 13 generates, from display data written to the VRAM 14 by the OS/the application program, video signals representing a display image to be displayed in the display 4.

The southbridge 15 controls access to the BIOS-ROM 17 and also controls disk drives (I/O devices) such as the HDD 16 and the ODD 22.

The HDD 16 is a storage device that stores the OS 50, the various types of application programs, and the like. The BIOS-ROM 17 is a rewritable nonvolatile memory that stores the system BIOS 51 which is a program for hardware control.

The EC/KBC 18 controls the touchpad 6 and the keyboard 7, which serve as input means. The EC/KBC 18 is a one-chip microcomputer that monitors and controls various types of devices (peripheral devices, sensors, a power supply circuit, and the like), regardless of the system-status of the personal computer 1. In addition, the EC/KBC 18 has the function of performing the power-on/power-off of the personal computer 1 in cooperation with the power supply controller 19 in response to a user's operation performed on the power supply switch 8.

The ODD control module 18a controls the ODD 22 when the system power supply of the personal computer 1 is turned off. That is, when a command entered by a user's operation to instruct the turn-off of the system power supply is input to the EC/KBC 18 via the BIOS 51, the ODD control module 18a receives from the power supply controller 19 a detection result indicating whether the AC adapter 21 is connected to an external power supply.

When the AC adapter 21 is not connected to the external power supply, that is, the AC adapter 21 is battery-driven, the AC adapter 21 is not connected to the personal computer 1 with a power cable. Accordingly, it is supposed that the personal computer 1 is used by being carried by a user. In this case, the eject switch 23 may accidentally be pushed down. Therefore, the supply of electric-power to the ODD 22 is stopped to prevent the tray from accidentally being ejected.

On the other hand, when the AC adapter 21 is connected to the external power supply, it is supposed that the AC adapter 21 and the personal computer 1 are connected to each other by a power cable, and used by being placed on a desk. In this case, the possibility of accidentally pushing down the eject switch 23 is low, as compared with the case of using the computer 1 by being battery-driven. Accordingly, the supply of electric-power to the ODD 22 is continued during a certain time measured by the timer 18b. Thus, the tray can be ejected when the eject switch 23 is operated. With this configuration, even after the system power supply of the personal computer 1 is turned off, the tray of the ODD 22 can be ejected during the certain time, without turning on the system power supply of the personal computer 1 again.

When external electric-power is supplied via the AC adapter 21, the power supply controller 19 generates system electric-power to be supplied to each component of the personal computer 1, using the external electric-power supplied from the AC adapter 21. When the external electric-power is not supplied via the AC adapter 21, the power supply controller 19 generates system electric-power to be supplied to each of components (the computer main unit 2 and the display unit 3), using the battery 20.

The power supply controller 19 detects whether the AC adapter 21 is connected to an external power supply. Then, the power supply controller 19 informs the ODD control module 18a of a detection result.

The ODD 22 is a drive for replaying optical discs. The ODD 22 has a tray for holding an optical disc. The ODD 22 reads the optical disc in a state in which the tray is housed in the body of the ODD 22. Then, the ODD 22 replays various data stored in the optical disc. More specifically, a spindle motor rotates the optical disc. In addition, an optical pickup head irradiates light beams onto the optical disc. Then, the optical pickup head outputs a detection signal representing detected reflection light from the optical disc. Consequently, the data stored by the optical disc can be read. The eject button 23 for instructing the ejection of the tray is provided on a side surface of the tray.

According to the embodiment, the ODD 22 is connected to the EC/KBC 18, together with the southbridge 15. The EC/KBC 18 is supplied with electric-power, regardless of the system-status of the personal computer 1. Thus, the EC/KBC 18 can always detect an instruction of the ejection of the tray, which is input via the ODD 22 from the ejection switch 23.

Figure 3:
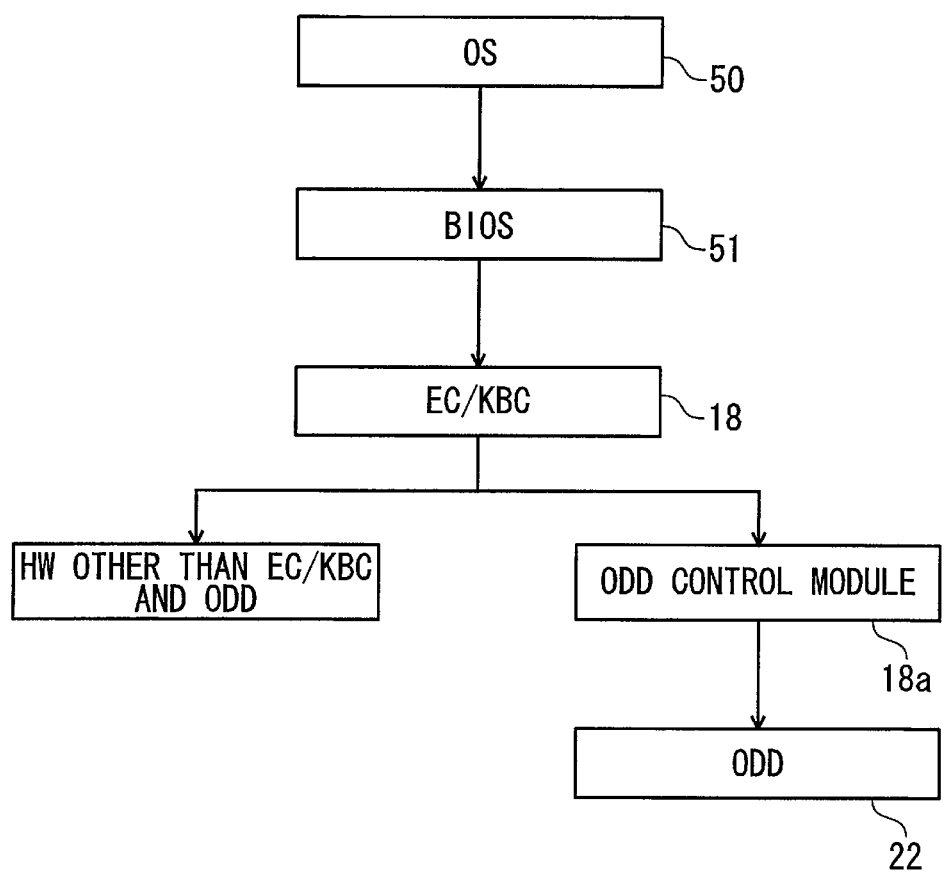
FIG. 3 is a diagram showing a procedure for stopping the supply of electric-power to the information processing apparatus according to the embodiment.

Next, an operation in the case of turning off the system power supply of the personal computer 1 is described hereinafter with reference to FIG. 3. FIG. 3 is a diagram showing a procedure for stopping the supply of electric-power to the information processing apparatus according to the embodiment.

First, when the turn-off of the system power supply of the personal computer 1 is selected by a user's operation performed on the power supply switch 8 or a screen, the OS 50 receives an instruction of the turn-off of the power supply. The instruction of the turn-off of the power supply is transmitted to each module of the personal computer 1 from the OS 50 via the BIOS 51. The EC/KBC 18 stops the supply of electric-power in association with the power supply controller 19 to hardware other than the EC/KBC 18 and the ODD 22. On the other hand, the ODD control module 18a receiving the instruction of the turn-off of the power supply via the EC/KBC 18 performs a power supply control process shown in FIG. 4. Then, the ODD control module 18a transmits the instruction of the turn-off of the power supply to the ODD 22.

Thus, as shown in FIG. 3, when an instruction of the turn-off of the system power supply of the personal computer 1, i.e., an instruction of stopping the supply of electric-power supplied from the battery 20 or the AC adapter 21 to each module is issued, a control operation differing from that performed on hardware other than the ODD 22 is performed on the ODD 22. That is, the power supply control to be applied to the ODD 22 is independently performed by the ODD control module 18a. The power supply control of the ODD 22 by the ODD control module 18a is described hereinafter with reference to FIG. 4.

Figure 4:
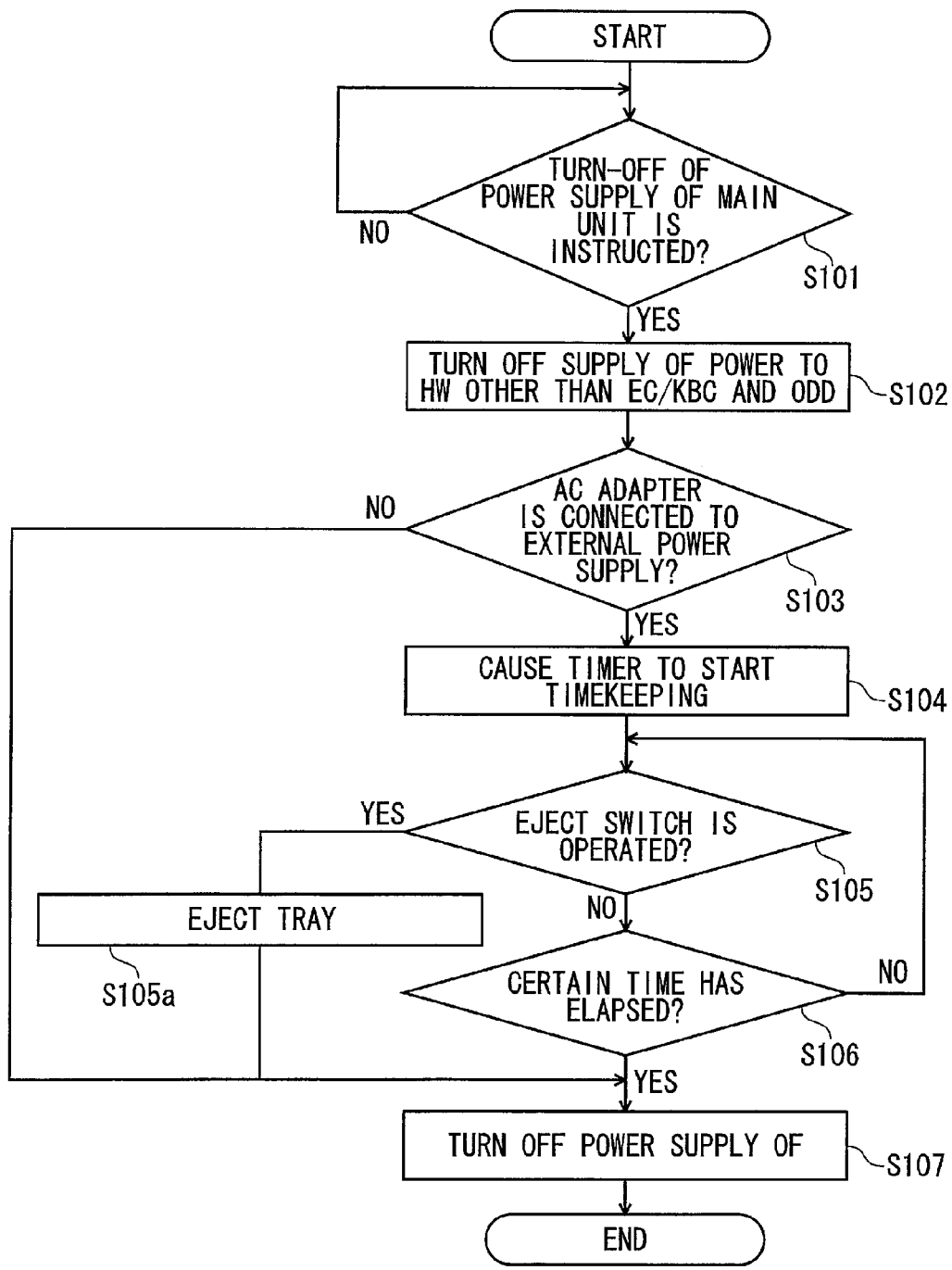
FIG. 4 is a flowchart showing a procedure for controlling the power supply of the information processing apparatus according to the embodiment.

FIG. 4 is a flowchart showing a power supply control procedure to be performed by the information processing apparatus according to the embodiment.

First, in step S101, the EC/KBC 18 determines whether the EC/KBC 18 receives the instruction of the turn-off of the system power supply of the personal computer 1. As a result of determination in step S101, when the EC/KBC 18 determines that the EC/KBC 18 does not receive the instruction of the turn-off of the system power supply of the personal computer 1 (No in step S101), the procedure returns to step S101.

On the other hand, when the EC/KBC 18 determines that the EC/KBC 18 receives the instruction of the turn-off of the system power supply of the personal computer 1 (Yes in step S101), in step S102, the EC/KBC 18 stops the supply of electric-power to hardware other than the EC/KBC 18 and the ODD 22, in corporation with the power supply controller 19.

Next, in step S103, the ODD control module 18a receives, from the power supply controller 19, a detection result indicating whether the AC adapter 21 is connected to the external power supply. The ODD control module 18a determines whether the AC adapter 21 is connected to the external power supply.

As a result of the determination made in step S103, when the ODD control module determines that the AC adapter 21 is not connected to the external power supply (No in step S103), the procedure proceeds to step S107. That is, because it is supposed that the personal computer 1 is battery-driven, and carried by a user, the power supply of the ODD 22 is turned off to prevent the eject switch 23 from accidentally being pushed down so that the tray of the ODD 22 is ejected.

On the other hand, as a result of the determination made in step S103, when the ODD control module 18a determines that the AC adapter 21 is connected to the external power supply (Yes in step S103), in step S104, the timer 18b starts timekeeping. Next, in step S105, the ODD control module 18a determines whether the eject switch 23 is operated.

As a result of the determination made in step S105, when the ODD control module 18a determines that the eject switch 23 is operated (Yes in step S105), the procedure proceeds to step S105a. That is, when an instruction for the ejection of the tray is issued within the certain time, the tray is ejected in step S105a, and then, the supply of electric-power to the ODD 22 is stopped in step S107.

On the other hand, when the ODD control module 18a determines, as a result of the determination made in step S105, that the eject switch 23 is not operated (No in step S105), in step S106, the ODD control module 18a refers to the timer 18b and determines whether the certain time indicated by data stored in the memory has elapsed.

When the ODD control module 18a determines, as a result of the determination made in step S106, that the certain time has not elapsed (No in step S106), the procedure returns to step S105. That is, until the certain time has elapsed, the ODD control module 18a continues to detect whether the eject switch 23 is operated.

As a result of the determination made in step S106, when the ODD control module 18a determines that the certain time has elapsed (Yes in step S106), the procedure returns to step S107. Thus, the power supply control procedure according to the embodiment is finished.

According to the embodiment configured as described above, even when the system power supply of the personal computer 1 is turned off, the supply of electric-power to the ODD 22 is continued for the certain time. Thus, the ejection of the tray is enabled.

When the AC adapter 21 is not connected to the external power supply, the ODD control module 18a stops the supply of electric-power to the ODD 22, and prevents the eject switch 23 from accidentally being pushed down while the computer 1 is carried.

In addition, when the eject switch 23 is pushed down during the certain time, the ODD control module 18a ejects the tray and immediately stops the supply of electric-power to the ODD 22. Thus, the embodiment can contribute to the power-saving of the personal computer 1 by stopping the supply of electric-power immediately after the tray is ejected.

While certain embodiment has been described, the exemplary embodiment has been presented by way of example only, and is not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
   an optical disc apparatus comprising a tray configured to receive an optical disc;
   modules other than the optical disc apparatus;
   a power-supply controller configured to control a supply of electric power from a power supply to the optical disc apparatus and each of the modules; and
   a receiver configured to receive a command to eject the tray in the optical disc apparatus, and configured to transmit information about the command to the power-supply controller,
   wherein, when the supply of electric power to each of the modules is stopped, the power-supply controller is configured to continue the supply of electric power to the optical disc apparatus during a time period,
   wherein, when the power-supply controller receives the information about the command within the time period, the power-supply controller is configured to eject the tray and to stop the supply of electric power to the optical disc apparatus,
   wherein the power-supply controller is configured to determine whether the power supply is connected to an external power source, and
   wherein, when the power-supply controller determines that the power supply module is not connected to the external power source, the power-supply controller is configured to stop the supply of electric power to the optical disc apparatus.

2. The apparatus according to claim 1, wherein, when supply of electric power to each of the modules is stopped, the power-supply controller is configured to be supplied with electric power and to receive information about the command from the receiver.

3. The apparatus according to claim 1, wherein the information processing apparatus is portable and can be battery-driven.

4. The apparatus according to claim 3, further comprising:
   a switch configured to eject the tray from the optical disc apparatus,
   wherein, when the switch is operated within the time period, the power-supply controller is configured to eject the tray and to stop the supply of electric power to the optical disc apparatus.

5. A power-supply control method for an information processing apparatus including an optical disc apparatus, comprising:
   supplying electric power to the optical disc apparatus and each of a plurality of modules in the information processing apparatus;

receiving a first command to stop the supply of electric power to each of the modules;

continuing the supply of electric power to the optical disc apparatus during a time period after receiving the first command;

ejecting the tray, after receiving within the time period a second command to eject a tray in the optical disc apparatus, and stopping the supply of electric power to the optical disc apparatus;

determining whether the information processing apparatus is connected to an external power source; and stopping the supply of electric power to the optical disc apparatus when it is determined that the information processing apparatus is not connected to the external power source.

6. The method according to claim 5, wherein the information processing apparatus is portable and can be battery driven, wherein the optical disc apparatus includes a switch configured to eject the tray from the optical disc apparatus, and wherein, ejecting the tray and stopping the supply of electric power to the optical disc apparatus when the switch is operated within the time period.

* * * * *